United States Patent [19]

Senuma et al.

[11] Patent Number: 5,260,363
[45] Date of Patent: Nov. 9, 1993

[54] ORGANOPOLYSILOXANE/OLEFIN COPOLYMERS

[75] Inventors: Akitaka Senuma, Yokohama; Toshiyuki Nagai, Ayase; Kiroku Tsukada; Akio Hayashi, both of Yokohama; Isao Noda, Yokosuka, all of Japan

[73] Assignee: Nippon Unicar Company Limited, Tokyo, Japan

[21] Appl. No.: 386,213

[22] Filed: Jul. 28, 1989

[30] Foreign Application Priority Data

Aug. 30, 1988 [JP] Japan .................. 63-219972

[51] Int. Cl.$^5$ .................................... C08K 5/54
[52] U.S. Cl. ........................ 524/269; 525/100; 525/106; 525/313; 428/447; 428/523
[58] Field of Search .............. 525/100, 106, 313; 524/269, 267

[56] References Cited

U.S. PATENT DOCUMENTS

| | | | |
|---|---|---|---|
| 2,888,419 | 5/1959 | Safford | 260/29.1 |
| 3,402,192 | 9/1968 | Haluska | 260/448.2 |
| 3,795,646 | 3/1974 | MacKenzie | 524/269 |
| 4,613,640 | 9/1986 | Deisler et al. | 524/264 |

FOREIGN PATENT DOCUMENTS

| | | | |
|---|---|---|---|
| 957095 | 10/1974 | Canada | 525/106 |
| 0334051 | 9/1989 | European Pat. Off. | 524/267 |
| 3524302 | 1/1987 | Fed. Rep. of Germany | 524/269 |
| 55-110139 | 8/1980 | Japan | 525/106 |
| 59-193944 | 11/1984 | Japan | 525/106 |
| 61-130360 | 6/1986 | Japan | 524/267 |
| 1294986 | 11/1972 | United Kingdom | |

Primary Examiner—Ralph H. Dean, Jr.

[57] ABSTRACT

A composition comprising:
(i) a crosslinkable thermoplastic resin;
(ii) an aliphatic monomeric compound having two or more carbon to carbon double bonds;
(iii) an organic peroxide crosslinking agent; and
(iv) a linear organopolysiloxane/alpha-olefin copolymer having the following formula:

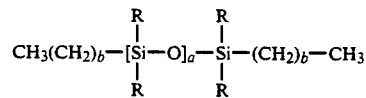

wherein
R is a saturated aliphatic or aromatic group and each R is alike or different;
a is about 1 to about 1000; and
b is about 5 to about 100

The composition is useful as coating composition for an electrical conductor.

10 Claims, No Drawings

ORGANOPOLYSILOXANE/OLEFIN COPOLYMERS

TECHNICAL FIELD

This invention relates to a linear organopolysiloxane/alpha-olefin copolymer useful in the preparation of film, sheet, and tubing.

BACKGROUND ART

Silicones have been widely used in various applications because of well known properties such as slip, mold release, oxygen permeability, water repellency, and electrical insulating. Insofar as extrusion and molding processes are concerned, however, the silicones have several drawbacks. One deficiency is low mechanical strength; another is the difficulty of forming the silicone into film; still another is poor moldability.

DISCLOSURE OF THE INVENTION

An object of this invention, therefore, is to provide a polyorganosiloxane, which takes advantage of the strong points of the silicones, and overcomes the drawbacks.

Other objects and advantages will become apparent hereinafter.

According to the present invention, the above object is met by a linear organopolysiloxane/alpha-olefin copolymer having the following formula:

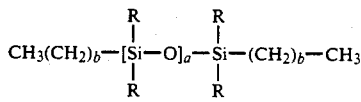

wherein
R is a saturated aliphatic or aromatic group and each R is alike or different;
a is about 1 to about 1000; and
b is about 5 to about 100.

DETAILED DESCRIPTION

In the above formula, R is a saturated aliphatic or aromatic group having 1 to 10 carbon atoms and preferably 1 to 6 carbon atoms. Examples of suitable R groups are methyl, ethyl, propyl, isopropyl, butyl, isobutyl, benzyl, phenyl, tolyl, xylyl, phenethyl, and naphthyl. The alkyl groups are preferred. The subscript a is preferably in the range of about 8 to about 200, and the subscript b is preferably in the range of about 8 to about 30.

The linear organopolysiloxane/alpha-olefin copolymer of the invention is prepared by reacting an organopolysiloxane having the following formula:

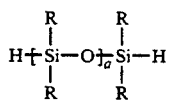

wherein R and a are as above with an alpha-olefin having the following formula:

wherein b is as above. The alpha-olefins are exemplified by 1-hexene, 1-octene, 1-dodecene, 1-tetradecene, 1-hexadecene, 1-octadecene, 1-eicosene, 1-doeicosene, 1-tetraeicosene, 1-hexaeicosene, 1-octaeicosene, 1-triacontene, 1-dotriacontene, 1-tetratriacontene, 1-hexatriacontene, 1 octatriacontene, 1-tetracontene, 1-pentacontene, 1-hexacontene, 1-heptacontene, 1-octacontene, 1-nonacontene, and 1-decacontene. These alpha-olefins can be used individually or as a mixture.

The reaction of the siloxane and alpha-olefin is carried out in the presence of a hydrosilylation catalyst. The catalyst can be an organic peroxide, an azo compound, a platinum compound such as chloroplatinic acid, or a platinum compound or platinum supported on an inert carrier such as silica or alumina. A preferred catalyst is an oxidated platinum acid, either in a unsupported or supported state. Platinum acid chloride is an example. Platinum hydrocarbon complexes and platinum alcoholate are also useful as catalysts A solvent is used where one of the reactants does not dissolve in the other reactant. A suitable solvent will be inert to the reaction, examples being benzene, toluene, hexene, pentane, hexane, heptane, octane, cyclopentane, cyclohexane, methanol, ethanol, propanol, and butanol.

The reaction can be carried out at a temperature in the range of about 50° C. to about 150° C. and is preferably effected at a temperature in the range of about 80° C. to about 120° C. There is no requirement as to pressure, i.e., the reaction can be carried out at subatmospheric, atmospheric, and superatmospheric pressures.

Generally, the orqanopolysiloxane, one or more alpha-olefins, the catalyst, and an inert solvent are introduced into a reactor under an inert atmosphere such as nitrogen. The reaction is continued until the viscosity of the mixture stops increasing. The reaction product is then neutralized and purified to provide the linear organopolysiloxane/alpha-olefin copolymer of the invention.

For each 100 parts of organopolysiloxane in the reaction mixture, the other components are added about as follows:

| Component | Parts by Weight | |
|---|---|---|
| | Broad Range | Preferred Range |
| alpha-olefin | 10 to 60 | 20 to 40 |
| catalyst | 0.001 to 0.01 | 0.003 to 0.005 |
| solvent (if needed) | 0 to 50 | 10 to 30 |

In order to utilize the linear organopolysiloxane/alpha-olefin copolymer in the manufacture of film, sheet, or tubing, the copolymer can be mixed with a crosslinkable thermoplastic resin, an aliphatic compound having two or more carbon to carbon double bonds, preferably two double bonds, and an organic peroxide crosslinking agent.

The thermoplastic resin can be any cross-linkable homopolymer or copolymer produced from two or more comonomers, or a blend of two or more of these polymers, conventionally used in film, sheet and tubing, and as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethlyhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alpha- methyl styrene, p-chloro styrene, vinyl naphthalene, and similar aryl olefins; nitriles such as acrylonitrile, methacrylonitrile, and alpha- chloroacrylonitrile; vinyl methyl ketone, vinyl methyl ether, vinylidene chloride, maleic anhydride, vinyl chloride, vinyl alcohol vinylidene chloride, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. In addition to polyolefins, included among the polymers can be polyesters, polycarbonates, and polyurethanes. The homopolymers and copolymers of ethylene are preferred, both in the non-halogenated and halogenated form. Included in the preferred group are terpolymers such as ethylene/propylene/diene monomer rubbers.

Aliphatic compounds having two double bonds are exemplified by the following compounds: 1,5 hexadiene, 1,6 heptadiene, 1,7 octadiene, 1,8 nonadiene, 1,9 decadiene, 1,10 undecadiene, 1,11 dodecadiene, 1,12 tridecadiene, 1,13 tetradecadiene, 1,14 pentadecadiene, 1,15 hexadecadiene, 1,16 heptadecadiene, 1,17 octadecadiene, bis(4-acryloxy polyethoxy phenyl)propane, 1,3 butylene glycol diacrylate, pentanediol diacrylate, neopentyl glycol diacrylate, 1,6 hexanediol diacrylate, diethylene glycol diacrylate, triethylene glycol diacrylate, tetraethylene glycol diacrylate, trimethylol propane triacylate, ethylene glycol dimethacrylate, 1,4 butanediol diacrylate, 1,3 butylene glycol dimethyacrylate, neopenthyl glycol dimethacrylate, 1,6 hexanediol dimethacrylate, diethylene glycol dimethyacrylate, triethylene glycol dimethacrylate, dipropylene glycol dimethacrylate, trimethylol ethane trimethacrylate, trimethylol propane trimethacrylate, diacryl phthalate, triallyl cyanurate, triallyl isocyanurate, triallyl trimellitate, and diallyl cholendate.

The organic peroxide crosslinking agent used in the composition of this invention preferably has a decomposition temperature of 100° to 220° C. for a half-life of 10 minutes and is exemplified by the following compounds (the numbers set off by the parentheses are their decomposition temperatures (°C.)): succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), di-isopropyl benzene hydroperoxide (170), p-menthane hydroperoxide (180), and 2,5-dimethyl hexane-2,5-dihydroperoxide (213).

In these compositions, which can be formed using conventional techniques such as extrusion, injection molding, calendering, and compression molding, for each 100 parts by weight of crosslinkable thermoplastic resin, suitable amounts of other components can be about as follows:

| Component | Parts by Weight | |
|---|---|---|
| | Broad Range | Preferred Range |
| Organopolysiloxane/olefin copolymer | 0.01 to 300 | 0.05 to 60 |
| Unsaturated aliphatic compound | 0.01 to 10 | 0.1 to 2 |
| Organic peroxide crosslinking agent | 0.1 to 10 | 0.5 to 3 |

These components can be used individually or mixtures of two or more of each of these components can be used.

Useful additives for the above composition are coupling agents, surfactants, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants.

Subject composition is usually heat-kneaded to make it homogeneous and prepare it for forming, i e., for extruding or molding, into film, sheets, tubes, and other articles of manufacture. The heat-kneading can be conducted in a Banbury mixer, a twin screw extruder, or in other conventional kneading apparatus. The kneading temperature is preferably in the range of about 100° to about 300° C. The forming equipment is also conventional.

The invention is illustrated by the following examples.

EXAMPLE 1

A linear organopolysiloxane/alpha-olefin copolymer as described above is prepared by reacting 100 parts by weight of an organopolysiloxane having the formula:

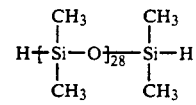

with 30 parts by weight of a mixture of alpha-olefins ($C_{20}$, $C_{22}$, $C_{24}$, $C_{26}$ and $C_{28}$) in the presence of platinum acid chloride at 25° C. It is noted that the resultant copolymer is waxy. The copolymer is incorporated into the following composition.

100 parts by weight of ethylene/vinyl acetate copolymer having a melt index of 2.5 grams per 10 minutes and containing 18 percent by weight vinyl acetate (based on the weight of the copolymer); 40 parts by weight of the above prepared organopolysiloxane/alpha-olefin copolymer; 1 part by weight triallyl trimellitate; 2 parts by weight dicumyl peroxide; and 0.1 part by weight of an antioxidant, tetrakis [methylene(3,5-di-tert-butyl-4-hydroxyhydrocinnamate)]methane are kneaded at 160° C. for 20 minutes in a Brabender mixer. The mixture is then compression formed into a 1 millimeter thick sheet. The sheet has a melt index of 30 grams per 10 minutes; a tensile strength of 80 kilograms per square centimeter; an elongation of 350 percent; and exhibits substantially no blooming. The sheet is pelletized and extruded into a tape at 160° C.

EXAMPLE 2

Example 1 is repeated without the dicumyl peroxide; however, the kneader slipped and a homogeneous product could not be formed.

EXAMPLE 3

Example 1 is repeated except that the organopolysiloxane has the following formula:

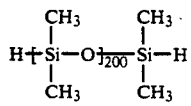

the alpha-olefin is a mixture of alpha-olefins, each having 30 or more carbon atoms; the crosslinkable thermoplastic resin is an ethylene/ethyl acrylate copolymer having a melt index of 6 grams per 10 minutes and containing 18 percent by weight ethyl acrylate; 30 parts by weight of the organopolysiloxane/alpha-olefin copolymer are used; the unsaturated aliphatic compound is triallyl isocyanurate; and kneading is carried out for 30 minutes. The results differ for this sheet in that the melt index is 40 grams per 10 minutes; the tensile strength is 60 kilograms per square centimeter; and the elongation is 300 percent.

EXAMPLE 4

Example 1 is repeated except that the crosslinkable thermoplastic resin is an ethylene-1-butene copolymer having a melt index of 4.7 grams per 10 minutes and a density of 0.900 gram per cubic centimeter; 35 parts by weight of the organopolysiloxane/alpha-olefin copolymer are used; 2 parts by weight of the unsaturated aliphatic compound, in this case, triallyl isocyanurate, are also used; and kneading is carried out at 100° C. for 10 minutes and then at 160° C. for 10 minutes. The results differ in that the melt index is 30 grams per 10 minutes; the tensile strength is 120 kilograms per square centimeter; and the elongation is 600 percent.

EXAMPLE 5

Example 1 is repeated except that the pellets are formed into a 70 micron thick inflated film at an extrusion temperature of 170° C. and a blow ratio of 1:6 using a 40 millimeter screw extruder having a length to diameter ratio of 24; and the inflated film has a rupture strength of about 220 kilograms per square centimeter.

EXAMPLE 6

Example 3 is repeated except that 7 parts by weight of a mixture of $C_6$, $C_8$, and $C_{10}$ alpha-olefins are used; the unsaturated aliphatic compound is triacryl isocyanurate; and the pellets are formed at 190° C. into a 10 millimeter outer diameter and a 2 millimeter thick tube using a 10 millimeter diameter extruder having a length to diameter ratio of 24 and the tube has a rupture strength of about 80 kilograms per square centimeter.

We claim:
1. A composition comprising:
   (i) a crosslinkable thermoplastic resin;
   (ii) an aliphatic monomeric compound having two or more carbon to carbon double bonds;
   (iii) an organic peroxide crosslinking agent; and
   (iv) a linear organopolysiloxane/alpha-olefin copolymer having the following formula:

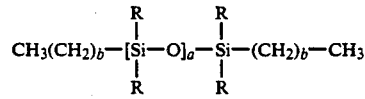

wherein
R is a saturated aliphatic or aromatic group and each R is alike or different;
a is about 1 to about 1000; and
b is about 5 to about 100.

2. The composition defined in claim 1 wherein the thermoplastic resin is a homopolymer or copolymer of ethylene and one or more alpha-olefins or unsaturated esters.

3. The composition defined in claim 2 in the crosslinked state.

4. The composition defined in claim 2 wherein R has 1 to 6 carbon atoms.

5. The composition defined in claim 2 wherein the subscript a is about 8 to about 200 and the subscript b is about 8 to about 30.

6. The composition defined in claim 2 wherein for each 100 parts by weight of thermoplastic resin there is about 0.01 to about 10 parts by weight of aliphatic compound; about 0.1 to about 10 parts by weight organic peroxide crosslinking agent; and about 0.01 to about 300 parts by weight copolymer.

7. The composition defined in claim 6 wherein the aliphatic compound is present in an amount of about 0.1 to about 2 parts by weight; the organic peroxide is present in an amount of about 0.5 to about 3 parts by weight; and the copolymer is present in an amount of about 0.05 to about 60 parts by weight.

8. An electrical conductor coated with the composition defined in claim 3.

9. An article of manufacture in the form of a film, sheet, or tube comprising the composition defined in claim 3.

10. An article of manufacture comprising an electrical conductor and at least one layer surrounding the conductor comprising the composition defined in claim 3.

* * * * *